United States Patent [19]
Robinson et al.

[11] 4,114,641
[45] Sep. 19, 1978

[54] SEWAGE RELIEF VALVE

[76] Inventors: Howard Keith Robinson, 3220 Isabella Dr., Oceanside, Calif. 92054; Larry Keith Robinson, 1361 Caren Rd., Vista, Calif. 92083

[21] Appl. No.: 708,202

[22] Filed: Jul. 23, 1976

[51] Int. Cl.² ............................................. F16K 31/20
[52] U.S. Cl. .................................. 137/430; 137/445; 137/448
[58] Field of Search ............. 137/429, 430, 445, 409, 137/415, 362, 448; 251/279, 104, 280

[56] References Cited
U.S. PATENT DOCUMENTS

| | | | |
|---|---|---|---|
| 1,113,648 | 10/1914 | Karlson | 137/448 |
| 1,222,611 | 4/1917 | Emory | 137/429 |
| 1,233,654 | 7/1917 | Dziatkiewicz | 137/445 |
| 1,268,947 | 6/1918 | Fell | 137/448 |
| 2,098,131 | 11/1937 | Bluhm | 137/430 |
| 2,506,022 | 5/1950 | Irvine | 137/445 |
| 2,539,076 | 1/1951 | Harris | 137/445 |
| 2,804,880 | 9/1957 | Rasmusson | 137/448 |
| 2,835,269 | 5/1958 | Seymour | 251/104 |
| 2,936,775 | 5/1960 | Hinkson et al. | 137/430 |
| 3,007,484 | 11/1961 | Hallinan | 137/430 |

Primary Examiner—Martin P. Schwadron
Assistant Examiner—G. L. Walton
Attorney, Agent, or Firm—Brown & Martin

[57] ABSTRACT

A sewage relief valve includes a cylindrical housing mounted on the upper end of an upper end of a riser connected to a sewer line, the housing includes a cylindrical through-bore with the upper end of the bore sealed by means of a dome cover held in place by a resilient O-ring, and a float supported beneath the housing on a lift linkage is responsive to rise with the level of liquid in the riser for forcing the cover from the end of the housing thereby relieving the sewage line. The lift linkage means is supported within the housing by support means which permits the linkage to be lifted and carried upward out of the housing by the float means when liquid flows therethrough.

6 Claims, 3 Drawing Figures

SEWAGE RELIEF VALVE

BACKGROUND OF THE INVENTION

The present invention relates to relief valves and pertains particularly to a sewage safety relief valve.

When a sewage line from a building becomes clogged or overloaded, sewage within the line may back up and flood the inside of the building. Such flooding is not only unsanitary but can cause considerable damage to the building and contents therein.

For this reason, it is desirable that simple, effective and inexpensive means be provided for preventing such backing up of sewage lines.

SUMMARY AND OBJECTS OF THE INVENTION

Accordingly, it is the primary object of the present invention to overcome the above problems of the prior art.

Another object of the present invention is to provide a simple, effective and inexpensive sewage relief valve for preventing back up in a sewage line.

A further object of the present invention is to provide a simple, and inexpensive sewage relief valve that is arranged to provide unobstructed flow of fluid from the sewage line once the relief valve is actuated.

In accordance with the primary aspect of the present invention, a sewage relief valve includes a valve body for mounting on the upper end of the riser part connected to a sewage line and including an actuating float which operates through linkage means for lifting a sealed cover from the upper end of the housing and permits unobstructed flow of fluid therefrom.

BRIEF DESCRIPTION OF THE DRAWING

The above and other objects and advantages of the present invention will become apparent from the following description when read in conjunction with the drawing wherein.

DETAILED DESCRIPTION OF A PREFERRED EMBODIMENT

Figure 1:
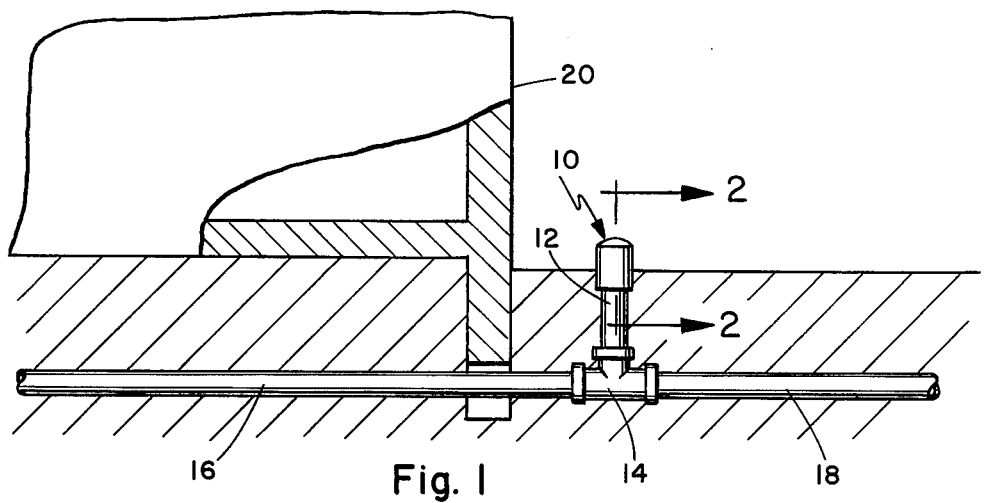
FIG. 1 illustrates a typical installation of the sewage relief valve of the present invention.
Figure 2:
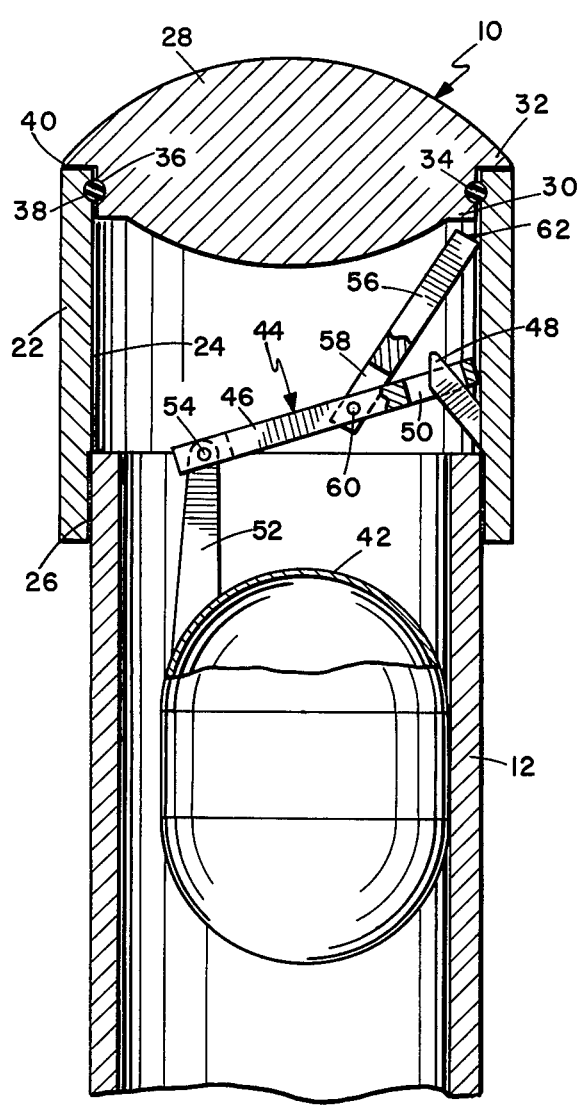
FIG. 2 is an enlarged sectional view taken generally along lines 2-2 of FIG. 1.

Turning now to the drawing, there is illustrated in FIG. 1 a typical installation of a relief valve in accordance with the invention wherein the relief valve designated generally by the numeral 10 is mounted on the upper end of a riser 12 which is connected by a suitable T-joint 14 to an upper line 16 and a lower or downstream line 18. The sewer line is connected to the usual facilities within a building generally designated by the numeral 20 for carrying sewage and the like from the building to suitable treatment facilities or the like. The relief valve comprises a generally cylindrical housing 22 having an internal through-bore 24 and connected at the upper end of a riser 12. The housing 22 is connected by suitable means such as threading or other suitable means including seal means 26 to the upper end of the housing 12.

The upper end of the housing 22 is sealed by means of a dome cap or cover which includes a cylindrical axially projecting portion 30 surrounded by an annular shoulder 32 which abuts the upper end of the housing 22. The cover or cap is sealed in and held into position on the upper end of the housing 22 by means of a resilient O-ring 34 which rests within an annular groove 36 formed in the cylindrical extension 30 of the cap 28 and a groove 38 formed in the upper end of the bore 24 of housing 22. The O-ring 34 is preferably of a resilient material, such as neoprene or rubber, and permits tight fitting engagement of the cap 38 within the bore 24 thus sealing off the upper end of the housing 22 and riser 12. This resilient sealing arrangement permits the cap to be dislodged from the upper end of the housing with a nominal amount of force within the housing. It should also be noted at this point that the cap 28 is dome shaped in configuration with the dome surface and the shoulder 32 coming substantially to a point or annular edge 40 to thereby prevent easy removal from the outside. The diameter defined by edge 40 is equal to or less than the outer diameter of housing 22. Thus, the cover cannot be easily removed with the hands. This prevents unauthorized tampering.

The present construction can also serve as an access or clean-out line for the sewer line itself. Accordingly, provision may be made for a special tool to engage in and remove the cap 28 from the upper end of the housing.

Figure 3:
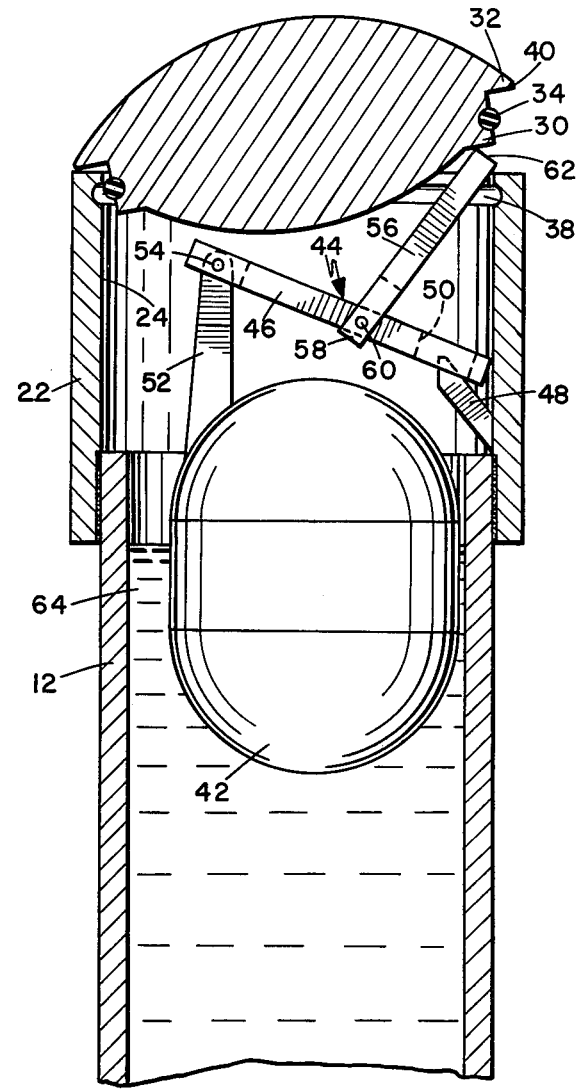
FIG. 3 is a similar sectional view with the relief valve shown in the open position.

Means responsive to a rise in the fluid or liquid in the pipe 12 includes a float 42 connected by suitable lift linkage means designated generally by the numeral 44 which is operative to engage and lift the cap 28 from the end of the housing 22 upon a rise in the liquid level within the pipe 12 as shown in FIG. 3. The linkage means 44 includes a lever 46 pivotally connected on one end to a one way support means in the form of a hook 48 extending generally upward from the side wall internally of the housing 22 and extending into a slot 50 formed on the lever arm 46. The hook 48 serves as a fulcrum for lever 46 which is actuated by means of the float 42 which is connected by means of an arm 52 which extends upward and is pivoted by suitable pin means 54 to the outer end of lever 46. A push rod 56 includes a lower bifurcated end 58 including a pair of legs extending to either side of lever 46 and pinned thereto by means of a pin 60. The upper end of the push rod 56 includes a blunt end 62 for engaging the underside of cap 28 and forcing it upward and out of the bore 24.

The push rod 56 preferably extends up to the underside of cap 28 near the outer edge thereof to apply the force at one edge thereof for lifting and breaking the seal of the cap. The force required for breaking the cap is less if applied at the edge then if applied at the center.

The constructon of the lift linkage means as above described is such that the entire assembly is lifted and carried out of the riser 12 and housing 22 upon flow of liquid such as liquid 64 upward and out the upper end of the housing 22. This provides a completely unobstructed flow of fluid therethrough should the sewer line 18 become clogged and bore overloaded. This arrangement relieves the flow of liquid from upstream of the valve and thereby prevents a back up of the fluid or liquid and overflowing thereof within the building 20. While the present invention has been described and illustrated by means of a specific embodiment, it is to be understood that many changes and modifications may be made therein without departing from the spirit and scope of the invention as defined in the appended claims.

Having described our invention, We now claim:

1. A sewage relief valve, comprising:
    a valve body having a generally cylindrical throughbore for mounting on an upwardly extending riser connected to a sewer line,
    a cover sealingly detachably mounted on the upper end of said housing defining a valve member for sealing the upper end of said cylindrical throughbore,
    lift linkage means including a unidirectional lift rod for engaging and lifting said cover from the end of said housing only in the opening, said lift rod disengaging from the cover in the closing direction,
    float means disposed below said housing connected to said lift linkage means and responsive to a predetermined rise in liquid level toward said cover for actuating said lift linkage means into engagement with said cover for lifting said cover from said housing and unsealing said bore, and
    said lift linkage means being unidirectionally supported in said housing so that said float and said lift linkage is carried upward through said bore and out of said housing in response to a rise in liquid level through said housing.

2. The relief valve of Claim 1 wherein said lift linkage includes a lever supported at one end on an upwardly directed open hook means on said housing,
    pin means connecting the other end of said lever to said float, and
    an upwardly extending lift rod pivotally connected at its lower end to said lever and including an upper end for engaging and lifting said cover from said housing.

3. The relief valve of claim 1 wherein said cover includes a generally cylindrical extension thereof for extending into the bore of said housing, and
    an annular resilient seal member mounted on said cylindrical extension for engaging the surface of said bore for establishing a tight fitting engagement therebetween for establishing a seal between said cover and said bore of said housing and for retaining said cover on said housing.

4. The relief valve of claim 3 wherein said lift linkage includes a lever supported at one end on an upwardly directed open hook means on said housing,
    pin means connecting the other end of said lever to said float, and
    an upwardly extending lift rod pivotally connected at its lower end to said lever and including a blunt upper end for engaging and lifting said cover from said housing.

5. The relief valve of claim 3 wherein said lift linkage includes a lever supported at one end on an upwardly directed open hook means on said housing,
    pin means connecting the other end of said lever to said float, and
    an upwardly extending lift rod pivotally connected at its lower end to said lever and including a blunt upper end for engaging and lifting said cover from said housing.

6. The relief valve of claim 5 wherein said lift rod is connected to said lever at a point closer to said end supported on said hook means than to said end connected to said float, and
    the upper end of said lift rod is positioned to engage said cover means at the edge thereof.

* * * * *